United States Patent
Feber

(10) Patent No.: US 8,949,776 B2
(45) Date of Patent: Feb. 3, 2015

(54) GATEWAY CONSUMPTION FRAMEWORK

(75) Inventor: Yifat Feber, Ra'anana (IL)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 13/592,787

(22) Filed: Aug. 23, 2012

(65) Prior Publication Data

US 2014/0059516 A1 Feb. 27, 2014

(51) Int. Cl.
*G06F 9/44* (2006.01)

(52) U.S. Cl.
USPC .......................................... 717/105; 717/107

(58) Field of Classification Search
None
See application file for complete search history.

(56) References Cited

U.S. PATENT DOCUMENTS

| | | | |
|---|---|---|---|
| 2009/0288014 A1* | 11/2009 | Fujioka | 715/745 |
| 2012/0137227 A1* | 5/2012 | Gerken et al. | 715/747 |
| 2013/0159530 A1* | 6/2013 | James et al. | 709/226 |

* cited by examiner

*Primary Examiner* — Lewis A Bullock, Jr.
*Assistant Examiner* — Mark Gooray
(74) *Attorney, Agent, or Firm* — Buckley, Maschoff & Talwalkar LLC

(57) ABSTRACT

According to some embodiments, a method and apparatus are provided to display to a developer, a list of business application user interface templates. A selected user interface template from the displayed list of business application user interface templates is received. Business logic definition parameters are also received. Based on the selected user interface template and the received business logic definition parameters, potential services available to be consumed by a business application from a suite of enterprise applications is determined and an indication of the list of potential services to the developer device is transmitted.

11 Claims, 9 Drawing Sheets

GATEWAY CONSUMPTION FRAMEWORK

BACKGROUND

Developing software applications can be a complicated process. Most applications use front ends that are well known to developers. However, connecting to a back-end system requires knowledge of how to interface with the back-end system. For example, a developer has to know the schema and business logic associated with the back-end system. Developers who are not familiar with the back-end system will have a steep learning curve when developing applications that interface with the back-end system. Furthermore, a developer who is not familiar with a back-end system may be able to accidentally harm the back-end system.

By not being familiar with the business logic, and having a steep learning curve, the cost of development is increased and applications may be more error prone than using developers who are familiar with the back-end system.

DETAILED DESCRIPTION

Figure 1:
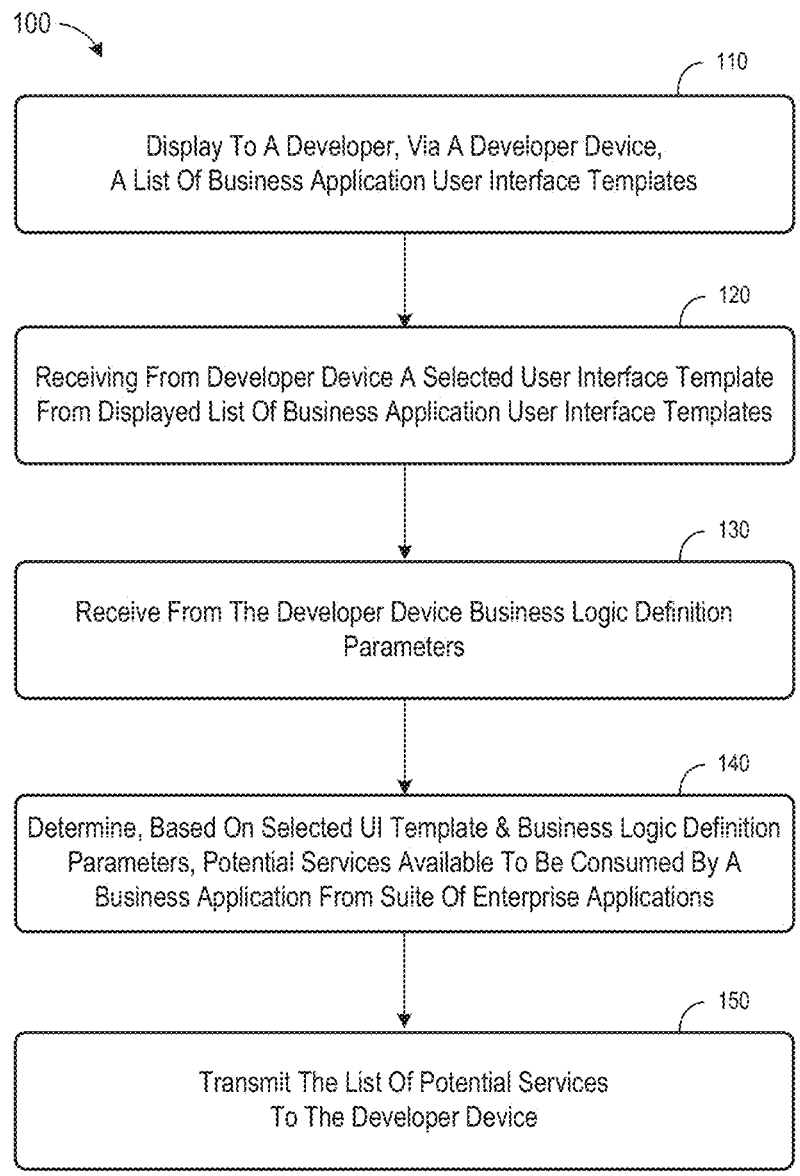
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by a system such as, but not limited to, the system of FIG. 2. The method 100 may be associated with a business process expert who creates templates associated with a back-end system, and an application developer who uses the templates to create a business application. The template developer (i.e., the business process expert) may comprise an expert in specific business processes, and the application developer may comprise an expert in an application technology (e.g. .Net or iOS). The method 100 may relate to the application developer using a framework created by the business process expert in a business process (e.g., where the application developer is not familiar with a back-end system) to create a business application via user interface templates associated with the back-end system. The framework may guide the experts/developers, who are not familiar with the back-end system, through the definition and development of user interface logic, business rules, and consumption of data.

At 110, a list of business application user interface templates is displayed to a developer via a developer device. Business application user interface templates may comprise, widgets associated with a graphical user interface ("GUI") to display information, such as, but are not limited to, a window, a text box, a selection box, a list box, an interactive map, editable detail fields, etc.

Figure 2:
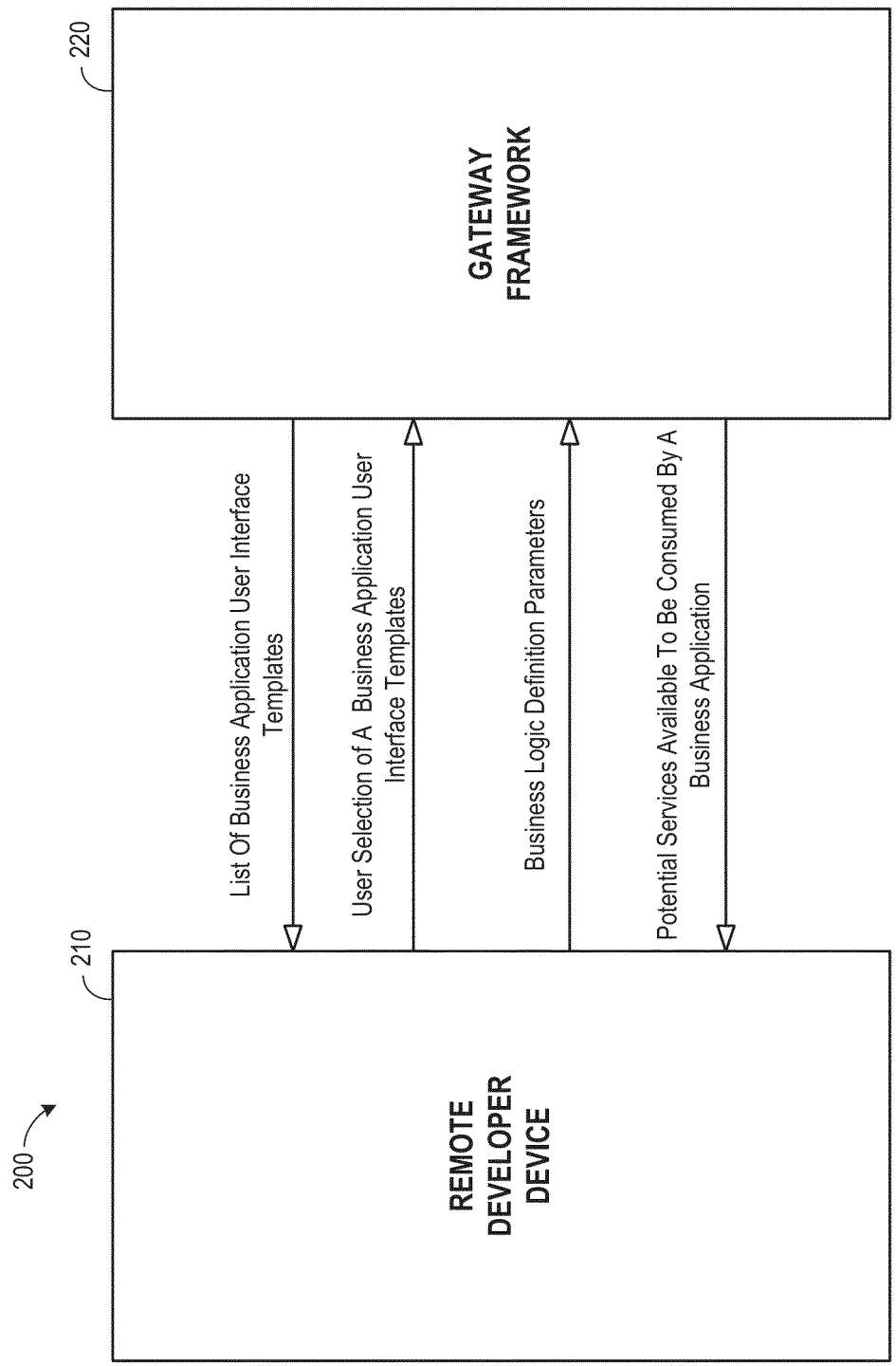
FIG. 2 illustrates a system according to some embodiments.

Now referring to FIG. 2, an embodiment of a system 200 is illustrated. The system comprises a remote developer device 210 in communication with a gateway consumption framework 220. In some embodiments, the gateway consumption framework 220 may comprise two parts: a server component (e.g., an Advanced Business Application Programming ("ABAP") add-on) that handles the Odata services, and a client component (e.g., a plugin to the developer device 210) which comprises the gateway framework.

The developer device 210 may comprise any computing device that includes a processor, a network connection and a user interface associated with the gateway consumption framework 220. As further illustrated in FIG. 2, the remote developer device 220 receives a list of available services from the gateway consumption framework 220. The gateway consumption framework 220 is further described with respect to FIG. 7 and FIG. 8.

Figure 3:
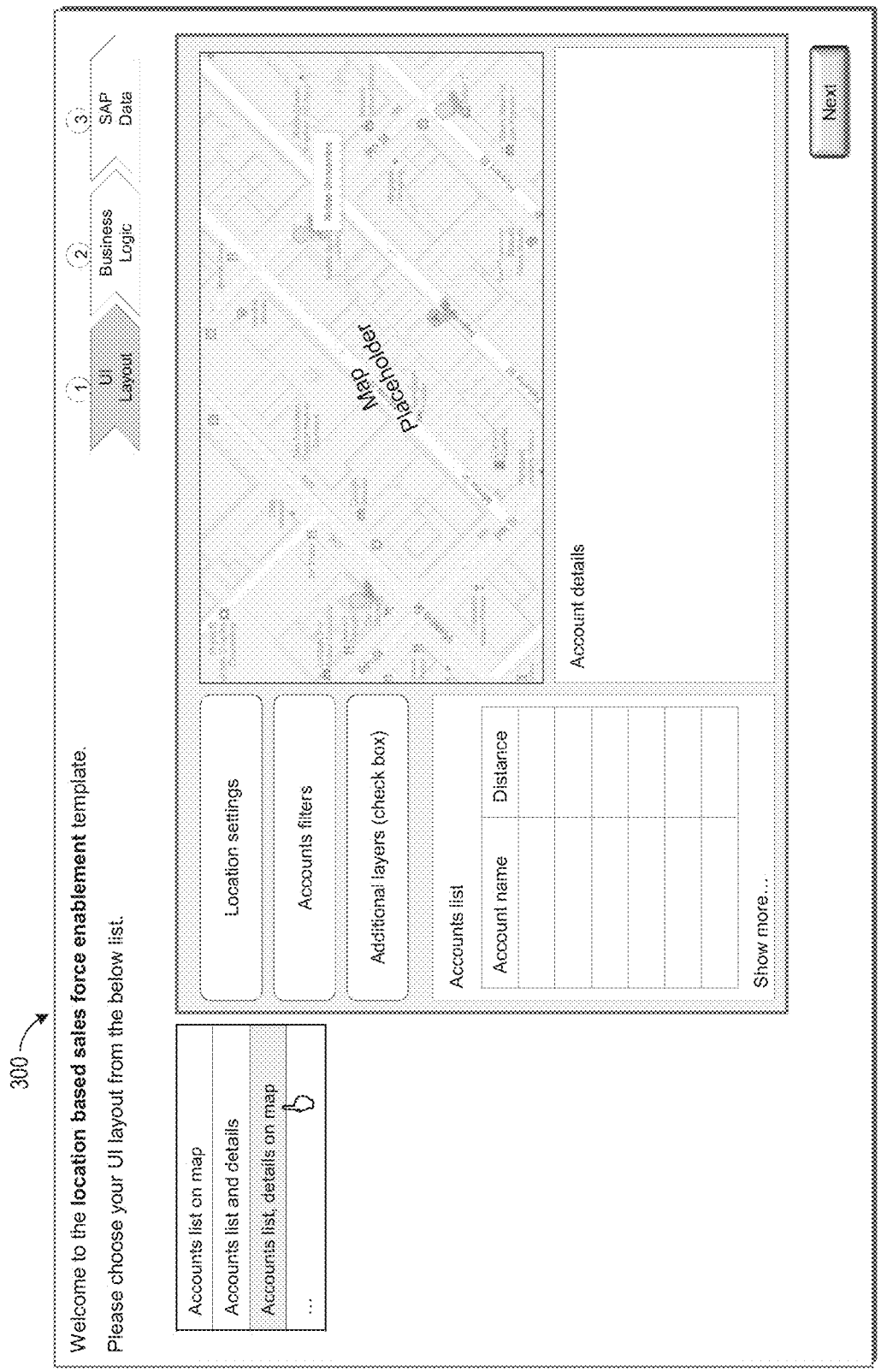
FIG. 3 illustrates a screen shot of an application according to some embodiments.

For illustrative purposes, and to aid in understanding features of the specification, an example will now be introduced. This example is not intended to limit the scope of the claims. For example, and referring now to FIG. 3, a developer who is not familiar with a system, such as a business specific database system, may desire to create a sales map application used for a mobile sales force. The developer may be presented with a list of business application user interface templates such as, but not limited to, an accounts list on a map, an accounts list and details, and an accounts list with details on a map. The aforementioned business application user interface templates may all be possible variants of the sales map application.

Referring back to FIG. 1, at 120, a selected business application user interface templates from the displayed list of business application user interface templates is received from the developer device. The developer, in response to receiving the list of business application user interface templates, may select a desired business application user interface template. As illustrated in FIG. 2, a selection of a business application user interface templates is sent from the developer device to the gateway consumption framework.

Continuing with the above example, and again referring to FIG. 3, the developer may select an "Account List, details on map" variant for the sales map application. In response to selecting the "Account List, details on map" variant, the developer's device may transmit an indication of the selected business application user interface templates to the gateway framework.

Next, at 130, business logic definition parameters are received from the developer device. The business logic definition parameters may define characteristics associated with the business application user interface. In some embodiments, default business logic definition parameters may come from the gateway consumption framework, as defined by a template creator.

Figure 4:
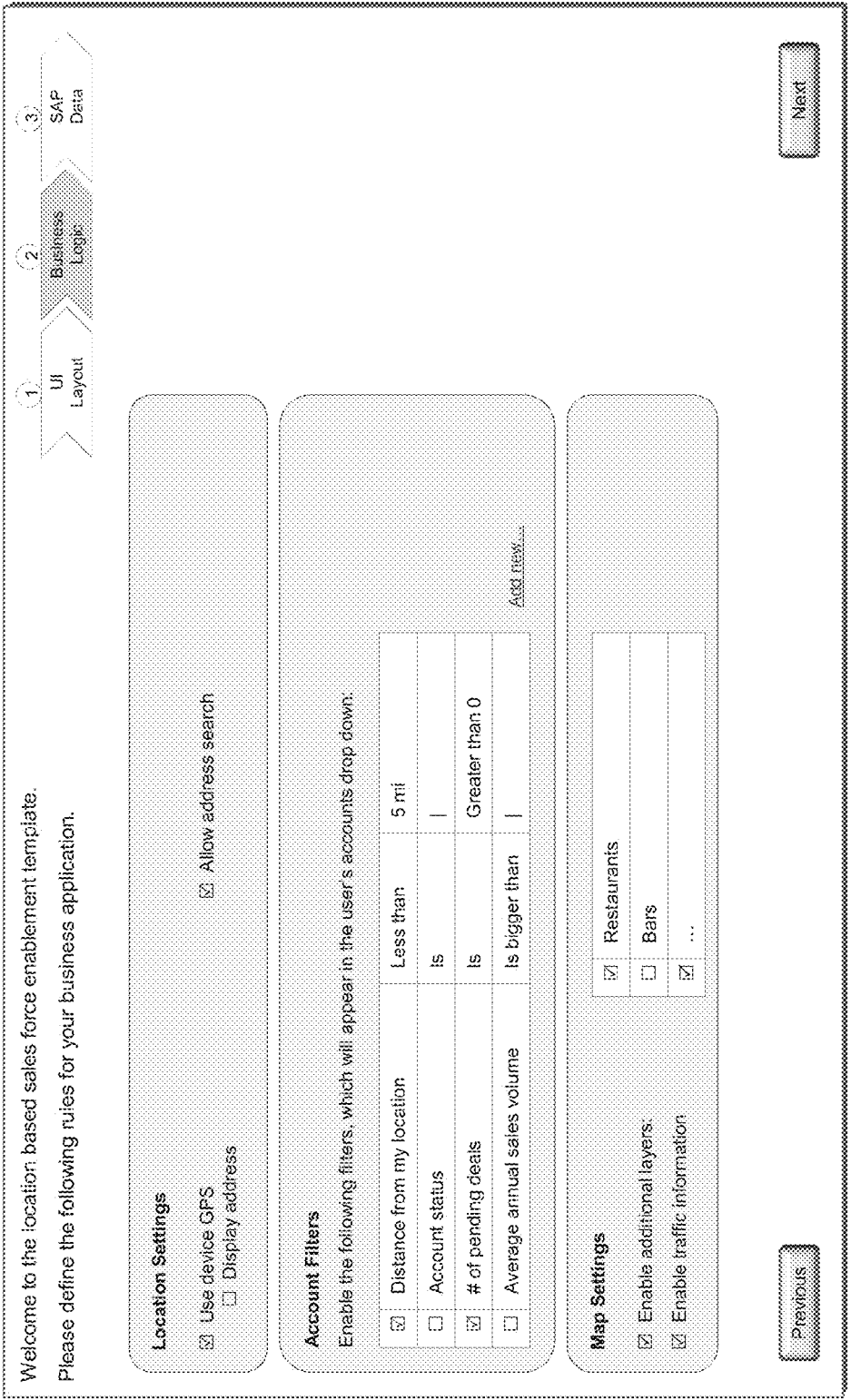
FIG. 4 illustrates a screen shot of an application according to some embodiments.

In one example, and now referring to FIG. 4, in the case of the above-mentioned example, the business logic definition parameters may comprise defining how locations are to be determined. As illustrated, locations may be based on (1) using a GPS device and (2) allowing an address to be searched. As further illustrated, an option to display the address is not selected which may also be considered an element of the business logic definition parameters.

Furthermore, the displaying of specific accounts may be determined by account filters. For example, accounts that are less than five miles from a user's current location (e.g., as determined by a GPS) may be displayed. The displaying of accounts may be limited by determining a number of pending deals with the account. For example, on accounts where the number of pending deals is greater than zero may be displayed. While the aforementioned logic is used in this example to determine accounts to displayed, accounts may also be limited by an average annual sales volume or by an account status. Other business logic pertaining to filters may also be added. Business logic pertaining to maps may also enable displaying additional layers that show restaurants, bars, etc. or may even display traffic information.

Next, at 140, a determination of potential services available to be consumed by a business application from a suite of enterprise applications is made based on the selected business application user interface template and the received business logic definition parameters. The potential services may be presented in a list of services associated with a back-end system, where each service is related to the proposed business logic and user interface. The list of potential services is transmitted to the developer device at 150. The services may be determined by querying the back-end system using the selected business application user interface template and the received business logic definition parameters. In some embodiments, a service may comprise a function.

Figure 5:
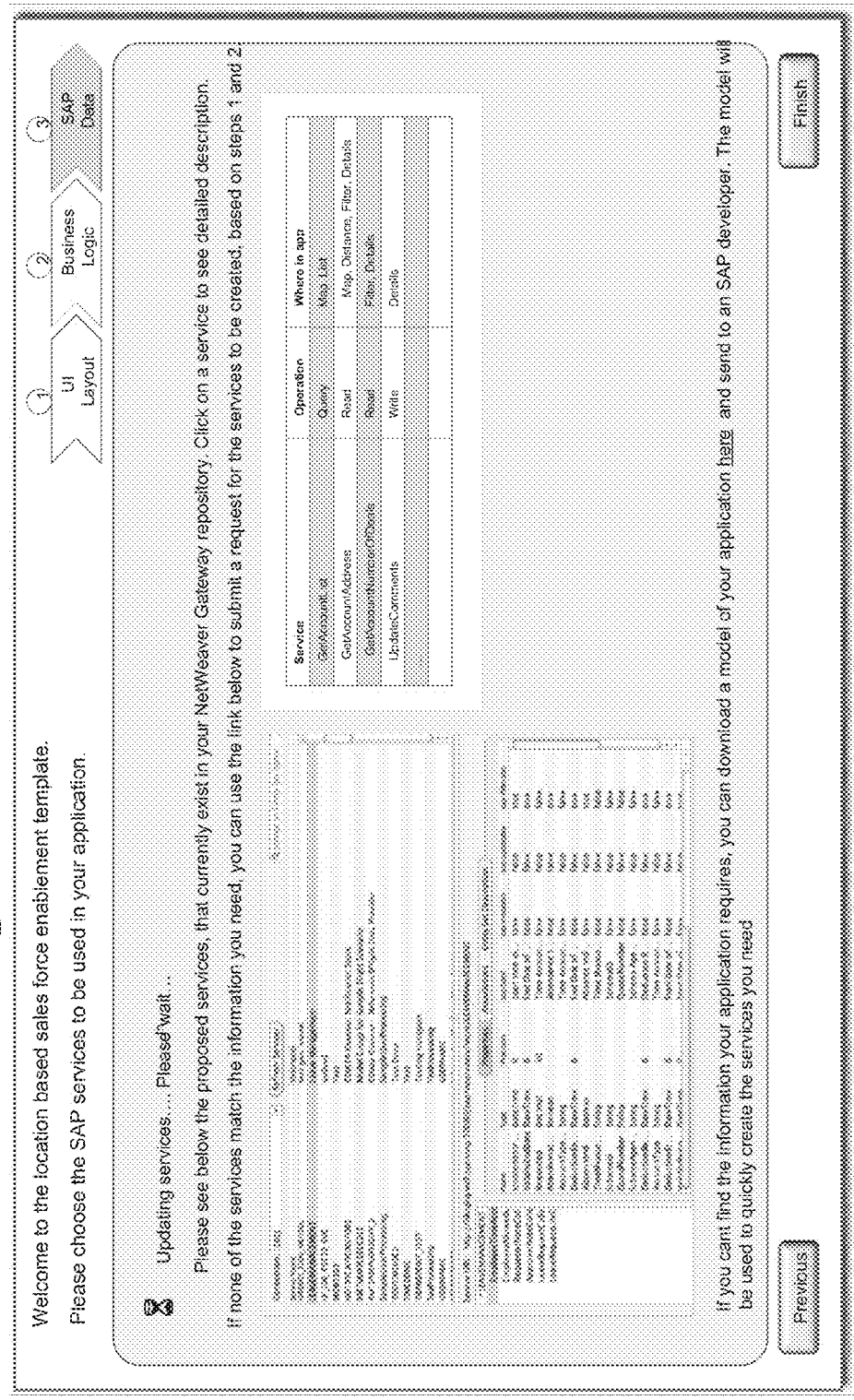
FIG. 5 illustrates a screen shot of an application according to some embodiments.

Example services may comprise, get account address, get account details, update comments for accounts, etc. As illustrated in FIG. 5, a developer may be presented with a list of related services and if none of the services match the service needed by the developer, the developer may submit a request for the needed service to be created based on the selected business application user interface template and the received business logic definition parameters.

Continuing with the above-example, and as further illustrated in FIG. 5, a developer may be able to select from the following services: GetAccountList, GetAccountAddress, GetAccountNumberOfDeals, and/or UpdateComments. The service GetAccountList may query the back-end system to get a list of accounts and this service may be associated with a map portion of the application and/or a list portion of the application. The GetAccountAddress service may read a map or other address mechanism to obtain an address of an account. For example, the address may be based on GPS coordinates and a distance from those coordinates. The UpdateComments service may provide a write function to enter details into the back-end system.

In some embodiments, if information required by the developer's application is not readily available, the developer may download a model of the application and have the model sent to a developer associated with the back-end system. In some embodiments, the model may be automatically sent electronically upon indicating that a desired service is not available. The developer associated with the back-end system may develop the required services based on the received model. The model may comprise the selected user interface template, the received business logic definition parameters and an indication of a selected service, or a service that is not currently available.

Figure 6:
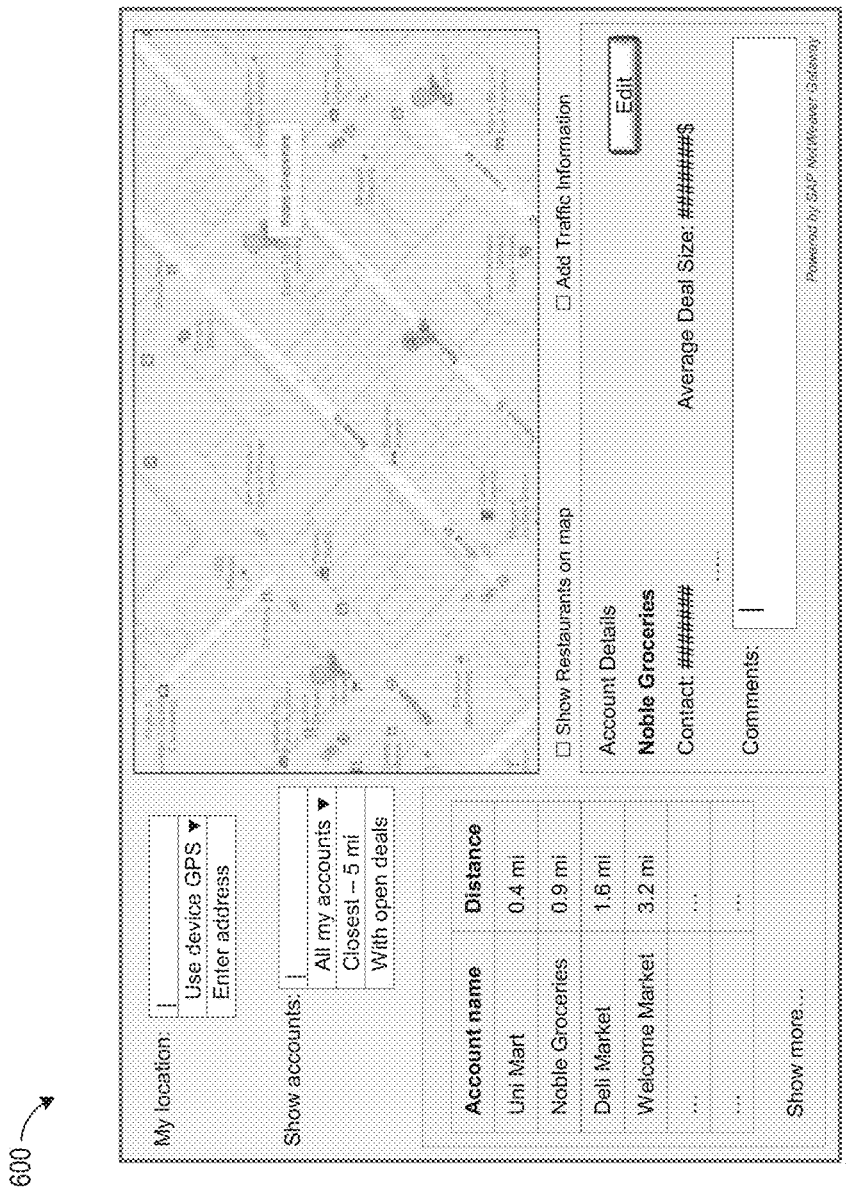
FIG. 6 illustrates a screen shot of an application according to some embodiments.

Once a developer has access to the required services, the developer can create the desired application. FIG. 6 illustrates an example of a completed application according to the aforementioned example.

Figure 7:
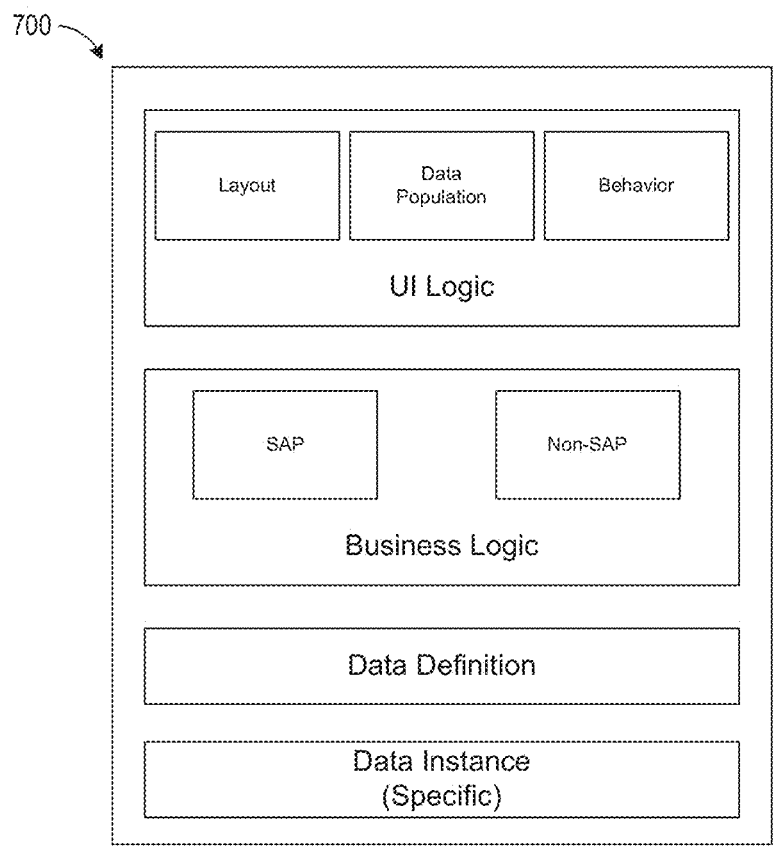
FIG. 7 illustrates a gateway consumption framework according to some embodiments.

Now referring to FIG. 7, an embodiment of a framework gateway is illustrated. The framework may comprise a plurality of layers to allow non-back-end associated developers to use the back-end system while protecting the back-end system from the outside (e.g., the non-back-end) developers. The framework gateway may be based on the Open Data Protocol ("OData") which is an open web protocol for querying and updating data. OData allows a user to query a data source using an HTTP protocol and receive a result in a useable format. OData can be used to expose and access data from several types of data source like databases, file systems and websites. Furthermore, the available services maybe associated with ODATA The framework gateway includes a first layer comprising user interface ("UI") logic, the second layer comprising business logic, the third layer comprising data definitions, and a fourth layer comprising specific data instances. For example, a Facebook developer may want to interface with a SAP system. By using the framework gateway, the developer can create applications based on templates, business logic, and data definitions while protecting the back-end (e.g., SAP) system. The user interface logic may comprise a series of layouts with specific behaviors and associated data population (e.g., a type of data). The business logic level relates to business logic for back-end system services, or non-back-end system services (e.g., external systems). The data definition layer and the data instance definition layer relate to how data will affect an application. The framework gateway may be implemented as an apparatus such as a gateway server.

The framework gateway provides two sets of tools, the first being for "grey haired developers" (e.g., more experienced developers) who choose objects that they wish to expose and make these objects available via a service that is later stored in a repository such as the database described with respect to FIG. 8. The grey haired developers may be employees of the back-end system.

The other tools are for "long haired developers" (e.g., developers who are less experienced in business applications associated with the back-end) who use the repository of services created by the grey haired developers to create applications.

Figure 8:
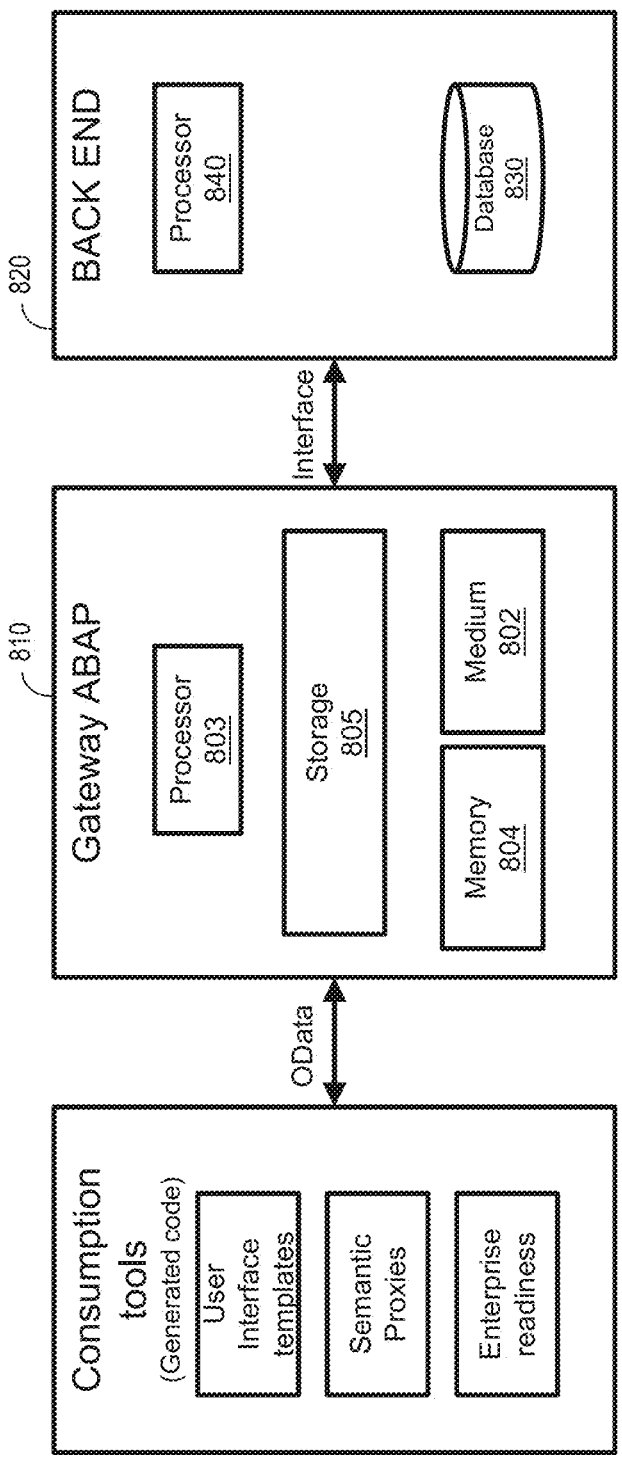
FIG. 8 illustrates a gateway consumption framework in communication with a back-end system according to some embodiments.

Now referring to FIG. 8, an embodiment of a gateway consumption framework 810 in communication with a back-end system 820 is illustrated. The gateway consumption framework 810 may comprise a user interface 801, a main memory 802, a processor 803, a medium 804, and a storage device 805. According to some embodiments, the gateway consumption framework 810 may further comprise a digital display port, such as a port adapted to be coupled to a digital computer monitor, television, portable display screen, or the like. In some embodiments, the Gateway consumption framework 810 may be associated with (e.g., stored) in a cloud. In other embodiments, the gateway consumption framework 810 may be associated with a server.

The user interface 801 may allow developers to interact with the gateway consumption framework 810 using text commands or with images/ graphical icons. In some embodiments, the user interface may comprise a keyboard, mouse, or associated port related thereto. Furthermore, the user interface 801 may be associated with a display or a touch screen.

The main memory 802 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 802 may comprise a plurality of memory modules.

The processor 803 may include or otherwise be associated with dedicated registers, stacks, queues, etc. that are used to execute program code and/or one or more of these elements may be shared there between. In some embodiments, the processor 803 may comprise an integrated circuit. In some embodiments, the processor 803 may comprise circuitry to perform a method such as, but not limited to, the method described with respect to FIG. 1.

The processor 803 communicates with the storage device 805. The storage device 805 may comprise any appropriate information storage device, including combinations of magnetic storage devices (e.g., a hard disk drive), optical storage devices, and/or semiconductor memory devices. The storage device 805 stores a program for controlling the processor 803. The processor 803 performs instructions of the program, and thereby operates in accordance with any of the embodiments described herein. For example, the processor 803 may output a list of services to a developer device.

The medium 804 may comprise any computer-readable medium that may store processor-executable instructions to be executed by the processor 803. For example, the medium 804 may comprise a non-transitory tangible medium such as, but is not limited to, a compact disk, a digital video disk, flash memory, optical storage, random access memory, read only memory, or magnetic media.

The program may be stored in a compressed, uncompiled and/or encrypted format. The program may furthermore include other program elements, such as an operating system, a database management system, and/or device drivers used by the processor 803 to interface with peripheral devices.

As used herein, information may be "received" by or "transmitted" to, for example: (i) gateway consumption framework 810 from another device; or (ii) a software application or module within the gateway consumption framework 810 from another software application, module, or any other source.

In some embodiments, the back-end system 820 comprises a database 830 (e.g., including information associated with user templates, business logic, and available services) and a processor 840. An example of a database 830 that may be used in connection with the gateway consumption framework 810 will now be described in detail with respect to FIG. 9. Note that the database described herein is only an example, and additional and/or different information may be stored therein. Moreover, various databases might be split or combined in accordance with any of the embodiments described herein.

Figure 9:
FIG. 9 illustrates a portion of a database that might be stored in accordance with some embodiments.

Referring to FIG. 9, a table is shown that represents a database 900 that may be stored locally at the back-end system 820 according to some embodiments. The table may include, for example, entries relating to specific services, their operations, and locations associated with specific services. The table may also define fields 902, 904, 906, and 908 for each of the entries. The fields 902, 904, 906, and 908 may, according to some embodiments, specify: a service identification 902, an operation type 904, a first application location 906, and second application location 908.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
    displaying to a developer, via a developer device, a list of business application user interface templates;
    receiving, from the developer device, a selected user interface template from the displayed list of business application user interface templates;
    receiving, from the developer device, business logic definition parameters;
    determining, based on the selected user interface template and the received business logic definition parameters, potential services available to be consumed by a business application from a suite of enterprise applications, the potential services to (i) send information to a back end and (ii) receive information based on the sent information;
    transmitting a list of potential services to the developer device;
    receiving a request, from the developer device, for a potential service not included in the list of potential services;
    transmitting the request for a potential service not included in the list of potential services to a second developer, wherein transmitting the request for a potential service not included in the list of potential services to a second developer comprises:
    automatically downloading a model of the application, the model comprising the selected user interface template, the received business logic definition parameters and an indication of a selected service or a service that is not currently available; and
    automatically transmitting the model to the second developer for building the potential service.

2. The method of claim 1, further comprising:
    Transmitting a model of an application, the application comprising the selected user interface template, the received business logic definition parameters and an indication of a selected service.

3. The method of claim 1, wherein the potential services are associated with ODATA.

4. The method of claim 1, wherein the potential services are accessed via a framework gateway based on ODATA, the framework gateway comprising a first layer to function as a user interface, a second layer comprising business logic, a third layer comprising data definitions and a fourth layer comprising specific data instances.

5. A non-transitory computer-readable medium comprising instructions that when executed by a processor perform a method, the method comprising:
    displaying to a developer, via a developer device, a list of business application user interface templates;
    receiving, from the developer device, a selected user interface template from the displayed list of business application user interface templates;
    receiving, from the developer device, business logic definition parameters;
    determining, based on the selected user interface template and the received business logic definition parameters, potential services available to be consumed by a business application from a suite of enterprise applications, the potential services to (i) send information to a back end and (ii) receive information based on the sent information;

transmitting a list of potential services to the developer device;

receiving a request, from the developer device, for a potential service not included in the list of potential services;

transmitting the request for a potential service not included in the list of potential services to a second developer, wherein transmitting the request for a potential service not included in the list of potential services to a second developer comprises:

automatically downloading a model of the application, the model comprising the selected user interface template, the received business logic definition parameters and an indication of a selected service or a service that is not currently available; and automatically transmitting the model to the second developer for building the potential service.

6. The medium of claim 5, wherein the method further comprises:

transmitting a model of an application, the application comprising the selected user interface template, the received business logic definition parameters and an indication of a selected service.

7. The medium of claim 5, wherein the potential services are associated with ODATA.

8. The medium of claim 5, wherein the potential services are accessed via a framework gateway based on ODATA, the framework gateway comprising a first layer to function as a user interface, a second layer comprising business logic, a third layer comprising data definitions and a fourth layer comprising specific data instances.

9. An apparatus comprising:
   a processor;
   a non-transitory computer-readable medium comprising instructions that when executed by the processor perform a method, the method comprising:

displaying to a developer, via a developer device, a list of business application user interface templates;

receiving, from the developer device, a selected user interface template from the displayed list of business application user interface templates;

receiving, from the developer device, business logic definition parameters;

determining, based on the selected user interface template and the received business logic definition parameters, potential services available to be consumed by a business application from a suite of enterprise applications, the potential services to (i) send information to a back end and (ii) receive information based on the sent information;

transmitting a list of potential services to the developer device;

receiving a request, from the developer device, for a potential service not included in the list of potential services;

transmitting the request for a potential service not included in the list of potential services to a second developer, wherein transmitting the request for a potential service not included in the list of potential services to a second developer comprises:

automatically downloading a model of the application, the model comprising the selected user interface template, the received business logic definition parameters and an indication of a selected service or a service that is not currently available; and automatically transmitting the model to the second developer for building the potential service.

10. The apparatus of claim 9, wherein the method further comprises:

transmitting a model of an application, the application comprising the selected user interface template, the received business logic definition parameters and an indication of a selected service.

11. The apparatus of claim 9, wherein the potential services are associated with ODATA.

* * * * *